March 11, 1969

G. MARCHIORELLO 3,432,196

PROCESS FOR CONSTRUCTING HIGH-INSULATION PANELS, PARTICULARLY
SANDWICH PANELS FOR PREFABRICATED FREEZERS, AND
PANELS PRODUCED BY THIS PROCESS

Filed June 28, 1966

INVENTOR.
GIOVANNI MARCHIORELLO
BY
*Kimmel, Crowell & Weaver*

ATTORNEYS.

United States Patent Office 3,432,196
Patented Mar. 11, 1969

3,432,196
PROCESS FOR CONSTRUCTING HIGH-INSULATION PANELS, PARTICULARLY SANDWICH PANELS FOR PREFABRICATED FREEZERS, AND PANELS PRODUCED BY THIS PROCESS
Giovanni Marchiorello, Via Nazionale 106, Belvedere di Tezze Sul Brenta, Vicenza, Italy
Filed June 28, 1966, Ser. No. 561,177
Claims priority, application Italy, July 10, 1965, 15,771/65
U.S. Cl. 287—189.36
Int. Cl. F16b 1/00, 5/00, 7/00

7 Claims

ABSTRACT OF THE DISCLOSURE

A joint and a method for connecting a plurality of panels to form a planar wall or a cornered wall in which identically constructed panels are utilized to erect either wall, and the geometry of the panel construction, per se, wherein each panel includes a continuous perimetric edge having a flat portion extending at an angle between a pair of opposed panel sides and an adjacent flat portion disposed at substantially right angles to the opposed panel sides.

---

This invention refers to a process for constructing high-efficiency insulation panels, particularly sandwich panels for prefabricated freezers; it also relates to the panels produced by this process.

It is well known that high-efficiency insulation panels are used in the construction of freezers, and also that a disadvantage in these appliances arises from thermal losses due to heat-bridging at the joints between the various panels.

The problem of quickly and easily producing a joint between panels to eliminate completely heat-bridging and ensure maximum efficiency and continuity in the insulation has been solved by this invention. This insulation is particularly useful in the field of prefabricated freezers of both stationary and movable types. Modern techniques use sandwich panels which are made of costly materials such as, for example, polyurethane resins and must be correctly utilized if a very high degree of insulation is to be achieved economically.

The invention is illustrated hereunder in one of its preferred embodiments in the drawings.

Figure 1:
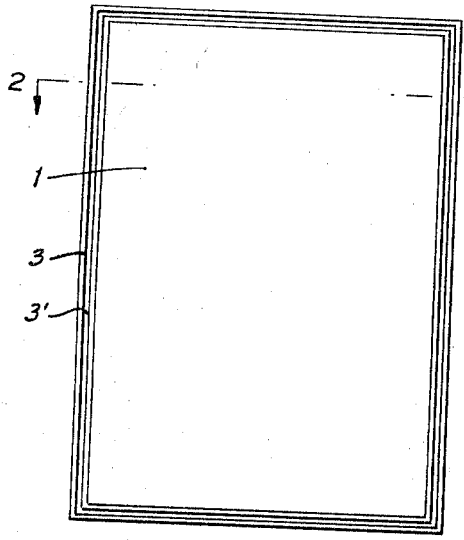
FIGURE 1 shows the outer face of a panel according to the invention.
Figure 3:
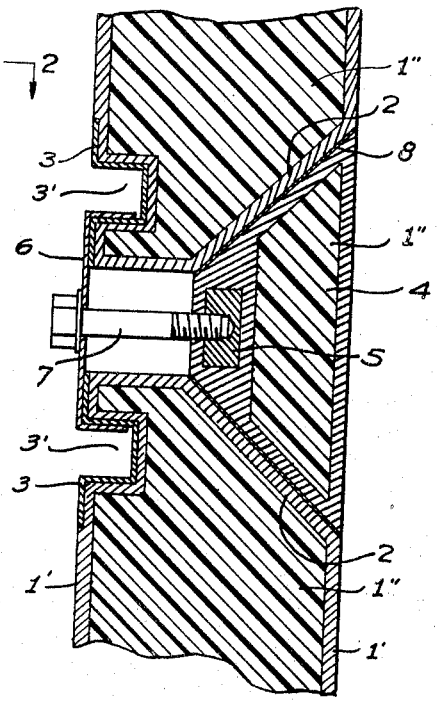
FIGURE 3 shows in detail a cross-section of a planar joint between two panels.
Figure 2:
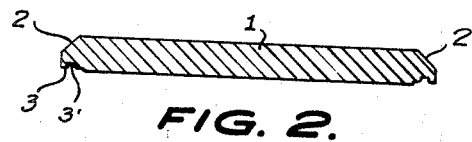
FIGURE 2 is a sectional view of the panel taken along line II—II of FIGURE 1.

The front view of FIGURE 1 and the cross-section view of FIGURE 2 shows panel 1 having a channel member 3 forming a groove 3'. The channel member 3 is applied to the "outward" face with reference to the freezer along the perimetric sections 3. The planar joint of FIGURE 3 is formed by prismatic member 4 secured by an embedded plate 5, locking section 6, and bolt or other fastener 7 between the two adjacent panels thus providing a perfect seal where chamfers 2 are located. A gasket 8 is inserted between the chamfers.

The prismatic member 4 is shown in its simplest form; as it is intended for the inner part of the freezer, and it may be shaped in alternate ways so as to meet various requirements such as providing division walls, fixing special carying structures within the freezer, etc., without disrupting the insulation of the perimetric walls of the freezer, i.e. without giving rise to heat-bridging.

Figure 4:
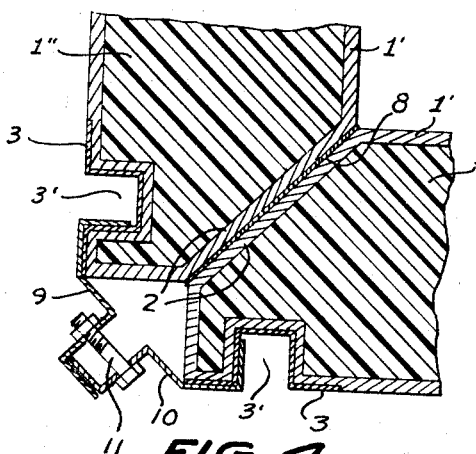
FIGURE 4 is a detailed view of a cross-section of a corner joint between two panels.
Figure 5:
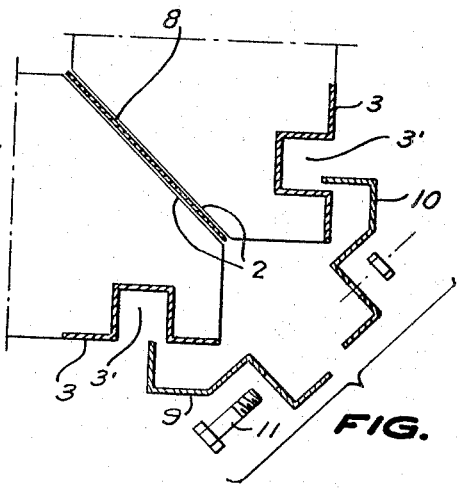
FIGURE 5 is a diagrammatic exploded view of members forming the angle joint of FIGURE 4.

In the case of angle joints it is clear that the panels according to this invention can be connected very accurately so that the continuity of the wall insulation is always ensured. FIGURES 4 and 5 show an angle joint. The two panels 1 are mutually approached at an angle of 90° after the gasket 8 has been inserted between the chamfered areas 2. The special locking sections 9 and 10 are then pushed into the grooves 3' of the channel member 3. By locking together sections 9 and 10 by means of the conventional connectors 11 a perfectly sealed joint is produced.

In the exploded section of FIGURE 5 the various members of the angle joint are shown, i.e. panels 1 with chamfer 2 and channel members 3 with grooves 3', gasket 8 to be inserted between the chamfers and the locking sections 9 and 10 with the relevant connectors 11.

It is clear that, according to the materials used in constructing the panel, various embodiments are possible through application of the basic concept of the invention. In fact, the skin of the two outer faces of panel 1 and the perimetric sections 3 can be made of the same material and embodied in a single metal or plastic structure in which the grooves 3' are pressed along the perimetric edge. These grooves receive the outer sections 6, 9 and 10 to complete the joints.

The process of this invention is performed by constructing a plurality of panels forming a 45 degree taper along their entire perimetric edge for a part of the panel thickness. The tapered edge is formed on the panel side intended to face inwardly upon construction of the freezer.

A metal channel member is applied to the opposite side of the panel during the construction stage along the entire perimetric edge. This side is intended to face outwardly in the freezer construction. The channel member is provided with a continuous groove which runs parallel to the edge and a short, uniform distance from the edge.

The panels are assembled to form the freezer in a combination of planar or corner joints. Planar joints are formed by interposing a prismatic member composed of a highly efficient insulating material between two panel edges and securing the prismatic member and the panels together by frictional fasteners.

The prismatic member is formed of an insulating substance and is provided internally with a metal foil or plate. The plate is subsequently drilled and may be threaded in the location where the panels are to be joined.

The prismatic members are formed with a 45 degree taper on each edge to comate with the similarly angled tapers on the panel edges.

The panels are coupled together by special locking sections and conventional frictional fasteners to obtain a perfect lock between the abutting surfaces of the tapered panel edges to form corner joints. A perfect lock is obtained between the abutting surfaces of the panels for both corner and planar joints.

The invention has been illustrated and described in its preferred embodiment, but alternate embodiments may obviously be carried out without departing from the scope of this patent.

I claim:
1. A wall construction comprising:
   a plurality of panels each having a perimetric edge forming a flat edge surface and a tapered edge surface, said tapered edge surface extending at an obtuse interior angle with respect to said flat edge surface, said flat edge surface extending substantially at right angles with respect to the panel sides and including a metal groove on the side distal from the tapered edge surface, said groove extending substantially parallel to said flat edge surface and being spaced therefrom, connecting means engaging the groove to two abutting panels herein described, frictional fastening means securing the panels and the connecting means in locked together relation, and wherein the flat edge surfaces of adjacent panels oppose each other in spaced parallel relationship, and further including a prismatic member having tapered side surfaces corresponding to the tapered portions of the adjacent panels and having a planar bottom surface, said prismatic member being secured by said fastening means in the groove formed between the adjacent tapered edge surfaces of the adjacent panels to form a planar panel joint.

2. A wall construction as defined in claim 1 wherein said tapered edge surface intersects one of said panels at substantially an angle of 45°.

3. A process for constructing a wall comprising, forming a panel having a flat portion and a tapered portion encompassing part of a perimetric edge, said flat portion extending at right angles to the panel surfaces and said tapered portion tapering inwardly toward a first panel surface and defining an obtuse interior angle with respect to said flat portion, applying a metal channel member adjacent the edge of the panel on an opposed second panel surface a uniform distance from the edge to form a groove in the second panel surface lined by the metal channel members;

locking the edges of two panels together in abutting relationship by inserting a locking section into the groove in each panel, securing the locking section to each panel and each panel to the other panel by frictional force, and the step of securing a prismatic member in the groove formed by the adjacent tapered edges to fill the space between the tapered edges to complete a planar joint.

4. A process for constructing a wall as defined in claim 3 and the further step of forming said tapered portions of said panels to extend from their respective said second panel surfaces at an angle of substantially 45°.

5. A process for constructing a wall including a corner therefor comprising, forming a panel having a flat portion and a tapered portion encompassing part of a perimetric edge, said flat portion extending at right angles to the panel surfaces and said tapered portion tapering inwardly toward a first panel surface and defining an obtuse interior angle with respect to said flat portion, applying a metal channel member adjacent the edge of the panel on an opposed second panel surface a uniform distance from the edge to form a groove in the second panel surface lined by the metal channel member;

locking the two edges of two panels together in abutting relationship by moving the adjacent tapered portions into flush engagement with one another, inserting a locking section into the groove in each panel to extend over each adjacent flat portion, and securing the locking section to each panel and each panel to the other panel by frictional force.

6. An insulating freezer construction panel comprising a panel composed of insulating material including a first side surface, a second side surface, the first and second side surfaces being parallel;

a perimetric edge forming, a tapered surface, angularly tapering toward and intersecting the first side surface at substantially a 45 degree angle, a perpendicular surface joined to the tapered surface and intersecting the second side surface substantially at right angles; and an elongated groove in the second side surface adjacent the perpendicular surface of the perimetric edge and extending parallel to the perpendicular surface so as to be spaced uniformly therefrom.

7. The panel of claim 6 wherein the groove comprises a metal channel member forming a groove applied in the second surface.

References Cited

UNITED STATES PATENTS

| | | | |
|---|---|---|---|
| 1,754,026 | 4/1930 | Loy et al. | 287—20.92 |
| 1,882,306 | 10/1932 | Tinnerman | 85—36 |
| 1,893,481 | 1/1933 | Adams | 52—584 |
| 2,209,580 | 7/1940 | Sargent | 287—189.36 |
| 2,300,743 | 11/1942 | Hauf et al. | 52—584 |
| 2,904,144 | 9/1959 | Moore | 287—189.36 |
| 2,091,061 | 8/1937 | Waugh | 287—20.92 |

FOREIGN PATENTS 757,262  9/1956  Great Britain.

CARL W. TOMLIN, Primary Examiner.

RAMON S. BRITTS, Assistant Examiner.

U.S. Cl. X.R.

52—584